United States Patent
Montgomery et al.

(10) Patent No.: US 7,363,762 B2
(45) Date of Patent: Apr. 29, 2008

(54) GAS TURBINE ENGINES SEAL ASSEMBLY AND METHODS OF ASSEMBLING THE SAME

(75) Inventors: Julius John Montgomery, Mason, OH (US); Robert Proctor, West Chester, OH (US); Nathan Gerard Cormier, Cincinnati, OH (US); Christopher Charles Glynn, Hamilton, OH (US); Glen William Royal, Pasadena, CA (US)

(73) Assignee: General Electric Company, Schenectady, NY (US)

( * ) Notice: Subject to any disclaimer, the term of this patent is extended or adjusted under 35 U.S.C. 154(b) by 163 days.

(21) Appl. No.: 11/280,440

(22) Filed: Nov. 16, 2005

(65) Prior Publication Data

US 2007/0110566 A1    May 17, 2007

(51) Int. Cl.
*F01D 3/04* (2006.01)

(52) U.S. Cl. .................. 60/685; 415/104; 415/107; 415/111; 415/173.5; 415/174.5; 29/464; 29/889.2; 29/889.22

(58) Field of Classification Search ............. 415/104, 415/106, 107, 111, 173.1, 173.5, 173.6, 174.5; 60/685, 751; 29/464, 467, 889.2, 889.22
See application file for complete search history.

(56) References Cited

U.S. PATENT DOCUMENTS

| 4,170,435 | A | * | 10/1979 | Swearingen | 415/104 |
|---|---|---|---|---|---|
| 5,855,112 | A |  | 1/1999 | Bannai et al. | |
| 6,067,791 | A | * | 5/2000 | Patel | 415/104 |
| 6,506,015 | B2 |  | 1/2003 | Nagata et al. | |
| 6,513,335 | B2 |  | 2/2003 | Fukutani | |
| 6,537,028 | B1 |  | 3/2003 | Izumi et al. | |
| 6,905,310 | B2 |  | 6/2005 | Kawamoto et al. | |
| 2001/0047651 | A1 |  | 12/2001 | Fukutani | |
| 2004/0005220 | A1 |  | 1/2004 | Kawamoto et al. | |
| 2005/0079050 | A1 |  | 4/2005 | Kokusho | |

FOREIGN PATENT DOCUMENTS

CA    486591    *    9/1952    ................ 415/106

* cited by examiner

*Primary Examiner*—Christopher Verdier
(74) *Attorney, Agent, or Firm*—William Scott Andes; Armstrong Teasdale LLP

(57) ABSTRACT

A method of assembling a gas turbine engine includes providing a gas turbine engine including a compressor, a combustor downstream from the compressor, and a turbine coupled to the compressor, and coupling a seal assembly aft of the compressor such that air discharged through the seal assembly facilitates reducing the cavity pressure, and therefore reducing the axial forces induced to an aft side of the compressor.

20 Claims, 5 Drawing Sheets

GAS TURBINE ENGINES SEAL ASSEMBLY AND METHODS OF ASSEMBLING THE SAME

BACKGROUND OF THE INVENTION

This invention relates generally to gas turbine engines and, more particularly, to methods and apparatuses for reducing thrust bearing net axial load caused by pressurized rotor-stator cavities.

Gas turbine engine rotor blades typically include a compressor, a combustor, and a high-pressure turbine. In operation, air flows through the compressor and the compressed air is delivered to the combustor wherein the compressed air is mixed with fuel and ignited. The heated airflow is then channeled through the high-pressure turbine to facilitate driving the compressor.

More specifically, High Pressure Centrifugal Compressors (HPCC) may contribute a relatively high percentage of the axial load to a high-pressure rotor thrust bearing. Gas turbine engines with multiple stage compressors and turbines may somewhat result in a balance axial load. However, utilizing a single stage HPCC, wherein the HPCC radius is larger than the turbine radius, may result in a relatively high forward axial load on the turbine.

To facilitate reducing the axial load on the turbine, at least one known gas turbine engine attempts to create a high flow and free vortex environment. However, this is relatively difficult to achieve in a typical HPCC rotor-stator cavity due to stator drag and limitations on flow for operability. As a result, pressure decreases may be realized at primarily at low radii with high flowing systems resulting in relatively small changes in load.

BRIEF DESCRIPTION OF THE INVENTION

In one aspect, a method of assembling a gas turbine engine is provided. The method includes providing a gas turbine engine including a compressor, a combustor downstream from the compressor, and a turbine coupled to the compressor, and coupling a seal assembly aft of the compressor such that air discharged through the seal assembly facilitates reducing the cavity pressure, and therefore reducing the axial forces induced to an aft side of the compressor.

In another aspect, a seal assembly for a gas turbine engine is provided. The seal assembly includes a labyrinth seal assembly that is coupled aft of the centrifugal compressor such that air discharged through the seal assembly facilitates reducing the cavity pressure, and therefore reducing the axial forces induced to an aft side of the centrifugal compressor.

In a further aspect, a gas turbine engine assembly is provided. The gas turbine engine assembly includes a centrifugal compressor, a combustor downstream from the centrifugal compressor, a turbine coupled to the compressor, and a seal assembly coupled aft of the centrifugal compressor such that air discharged through the seal assembly facilitates reducing the cavity pressure, and therefore reducing the axial forces induced to an aft side of the centrifugal compressor.

DETAILED DESCRIPTION OF THE INVENTION

Figure 1:
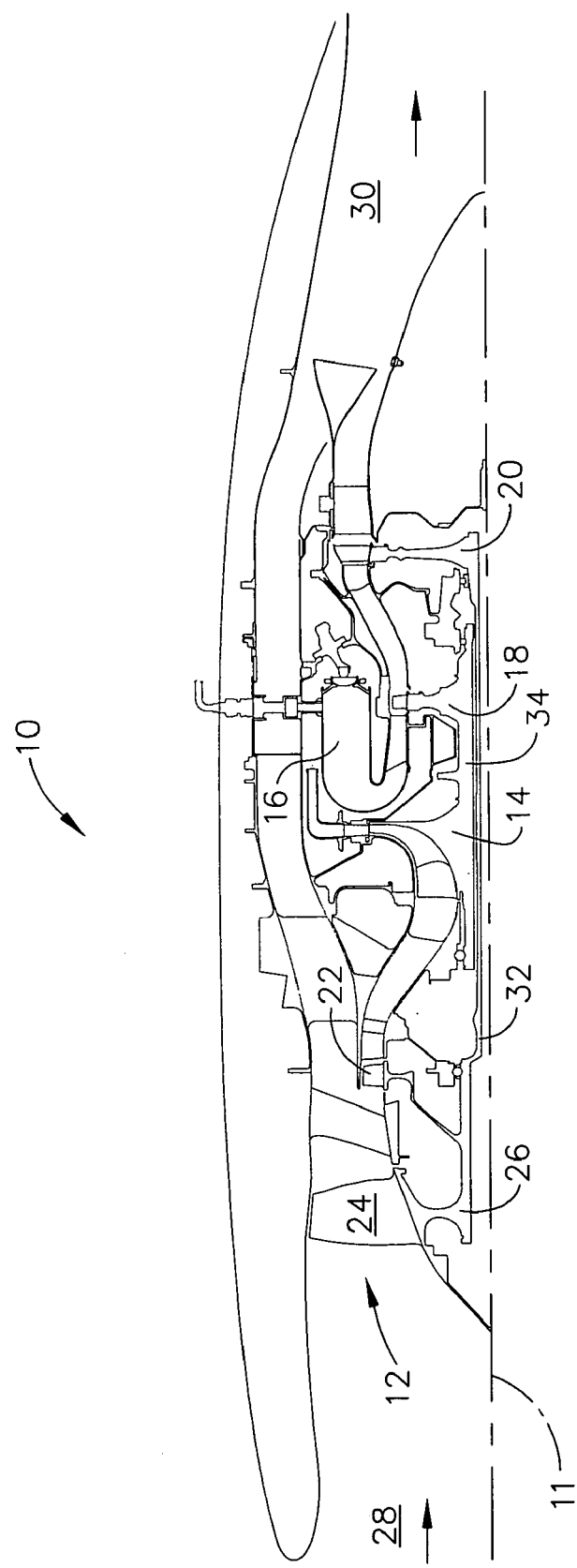
FIG. 1 is schematic illustration of an exemplary gas turbine engine.

FIG. 1 is a schematic illustration of an exemplary gas turbine engine assembly 10 having a longitudinal axis 11. Gas turbine engine assembly 10 includes a fan assembly 12, a high-pressure centrifugal compressor 14, and a combustor 16. Engine 10 also includes a high-pressure turbine assembly 18, a low-pressure turbine 20, and a booster compressor 22. Fan assembly 12 includes an array of fan blades 24 extending radially outward from a rotor disk 26. Engine 10 has an intake side 28 and an exhaust side 30. Fan assembly 12, booster 22, and low-pressure turbine 20 are coupled together by a first rotor shaft 32, and compressor 14 and high-pressure turbine assembly 18 are coupled together by a second rotor shaft 34. Although gas turbine engine assembly 10 is shown in the exemplary embodiment including a single stage centrifugal compressor 14 and a single stage high-pressure turbine 18, it should be realized that compressor 14 and turbine 18 may include a plurality of stages.

In operation, air flows through fan assembly 12 and compressed air is supplied to high-pressure compressor 14 through booster 22. The highly compressed air is delivered to combustor 16. Hot products of combustion from combustor 16 are utilized to drive turbines 18 and 20, which in turn drive fan assembly 12 and booster 22 utilizing first rotor shaft 32, and also drive high-pressure compressor 14 utilizing second rotor shaft 34, respectively.

Figure 2:
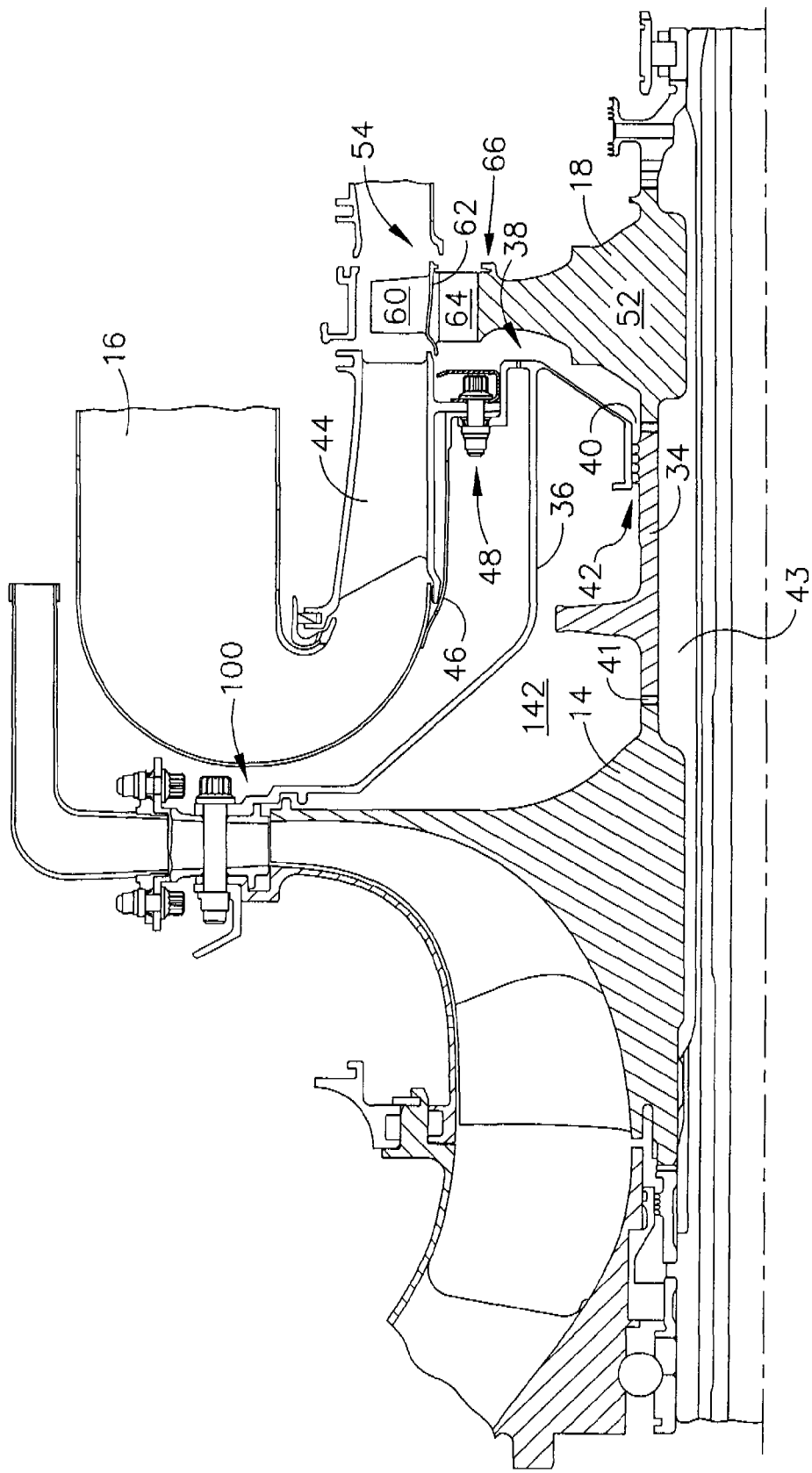
FIG. 2 is an enlarged cross-sectional view of a portion of the exemplary gas turbine engine shown in FIG. 1.
Figure 3:
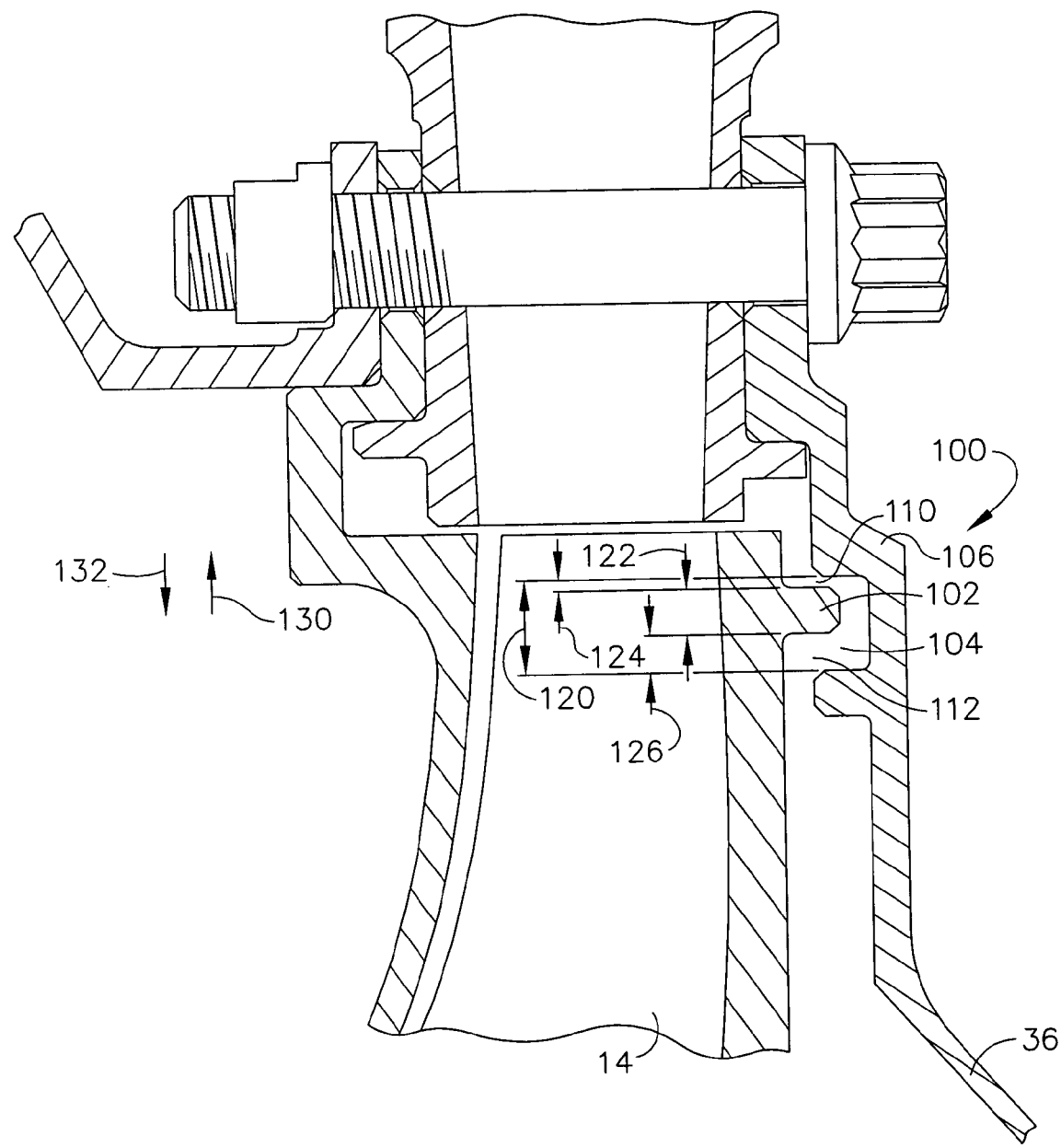
FIG. 3 an enlarged cross-sectional view of a portion of the gas turbine engine shown in FIG. 2.

FIG. 2 is an enlarged cross-sectional view of a portion of high-pressure compressor 14 (shown in FIG. 1). FIG. 3 an enlarged cross-sectional view of a portion of high-pressure compressor 14 assembly 18 (shown in FIG. 2).

In the exemplary embodiment, high-pressure turbine assembly 18 is coupled axially aft of a turbine mid-seal support structure 36 such that a cavity 38 is defined at least partially between mid-seal support structure 36 and high-pressure turbine assembly 18. Gas turbine engine 10 also includes a mid-frame labyrinth seal 40 that is coupled to mid-seal support structure 36 to facilitate reducing and/or eliminating air and/or fluid from being channeled through an opening 42 defined between a radially inner portion of mid-seal support structure 36 and shaft 34 into cavity 38. Moreover, gas turbine engine 10 includes a high-pressure turbine nozzle assembly 44 that is coupled axially upstream from high-pressure turbine assembly 18 and a diffuser section 46. In the exemplary embodiment, at least a portion of diffuser section 46, high-pressure turbine nozzle assembly 44, and mid-seal support structure 36 are coupled together using a plurality of mechanical fasteners 48.

In the exemplary embodiment, high-pressure turbine assembly 18 includes a rotor disk 52 and a plurality of rotor blades 54 that are coupled to rotor disk 52. Rotor blades 54 extend radially outward from rotor disk 52, and each includes an airfoil 60, a platform 62, a shank 64, and a dovetail 66. Platform 62 extends between airfoil 60 and shank 64 such that each airfoil 60 extends radially outward from each respective platform 62. Shank 64 extends radially inwardly from platform 62 to dovetail 66. Dovetail 66 extends radially inwardly from shank 64 and facilitates securing each rotor blade 54 to rotor disk 52.

To facilitate reducing the forward axial load on compressor 14, gas turbine engine 10 includes a labyrinth seal assembly 100 that is coupled axially aft of high-pressure compressor 14. Seal assembly 100 includes a tab 102 that is coupled to high-pressure compressor 14. In the exemplary embodiment, tab 102 is formed unitarily with high-pressure compressor 14. In the exemplary embodiment, tab 102 extends at least partially into a substantially U-shaped recess 104 that is defined by mid-seal support structure 36 such that a first orifice 110 is defined between tab 102 and recess 104 and a second orifice 112 is defined downstream between tab 102 and recess 104. In the exemplary embodiment, recess 104 is formed unitarily with mid-seal support structure 36, i.e. mid-seal support structure 36 is formed or shaped to define recess 104.

Recess 104 has a first width 120 and tab 104 has a second width 122 that is less than first width 120 such that tab 102 extends at least partially into recess 104. In the exemplary embodiment, first width 120 and second width 122 are each sized to enable first orifice 110 to have a first width or opening 124 and second orifice 112 to have a second width or opening 126 that are each selectively sized based on recess width 120 and tab width 122.

For example, assuming recess width 120 is fixed, increasing tab width 122 in a first direction 130 facilitates reducing the size or diameter of first orifice width 124 and thus reducing the quantity of airflow channeled through first orifice 110, whereas increasing tab width 122 is a second direction 132 facilitates reducing the size or diameter of second orifice width 126 and thus reducing the quantity of airflow channeled through second orifice 112. Whereas, reducing tab width 122 in a second direction 132 facilitates increasing the size or diameter of first orifice width 124 and thus increasing the quantity of airflow channeled through first orifice 110, whereas reducing tab width 122 is a first direction 130 facilitates increasing the size or diameter of second orifice width 126 and thus increasing the quantity of airflow channeled through second orifice 112.

Moreover, assuming tab width 122 is fixed, increasing recess width 120 in a first direction 130 facilitates increasing the size or diameter of first orifice width 124 and thus increasing reducing the quantity of airflow channeled through first orifice 110, whereas increasing recess width 120 is a second direction 132 facilitates increasing the size or diameter of second orifice width 126 and thus increasing the quantity of airflow channeled through second orifice 112. Whereas, reducing recess width 120 in a second direction 132 facilitates reducing the size or diameter of first orifice width 124 and thus reducing the quantity of airflow channeled through first orifice 110, whereas reducing recess width 120 is a first direction 130 facilitates reducing the size or diameter of second orifice width 126 and thus reducing the quantity of airflow channeled through second orifice 112.

Accordingly, and in the exemplary embodiment, tab width 120 and recess width 122 are each selectively sized to either increase or decrease the quantity of airflow channeled through orifices 110 and 112, respectively, and to thus vary the quantity of airflow channeled into a seal cavity 142 and then through labyrinth seal assembly 100.

Figure 4:
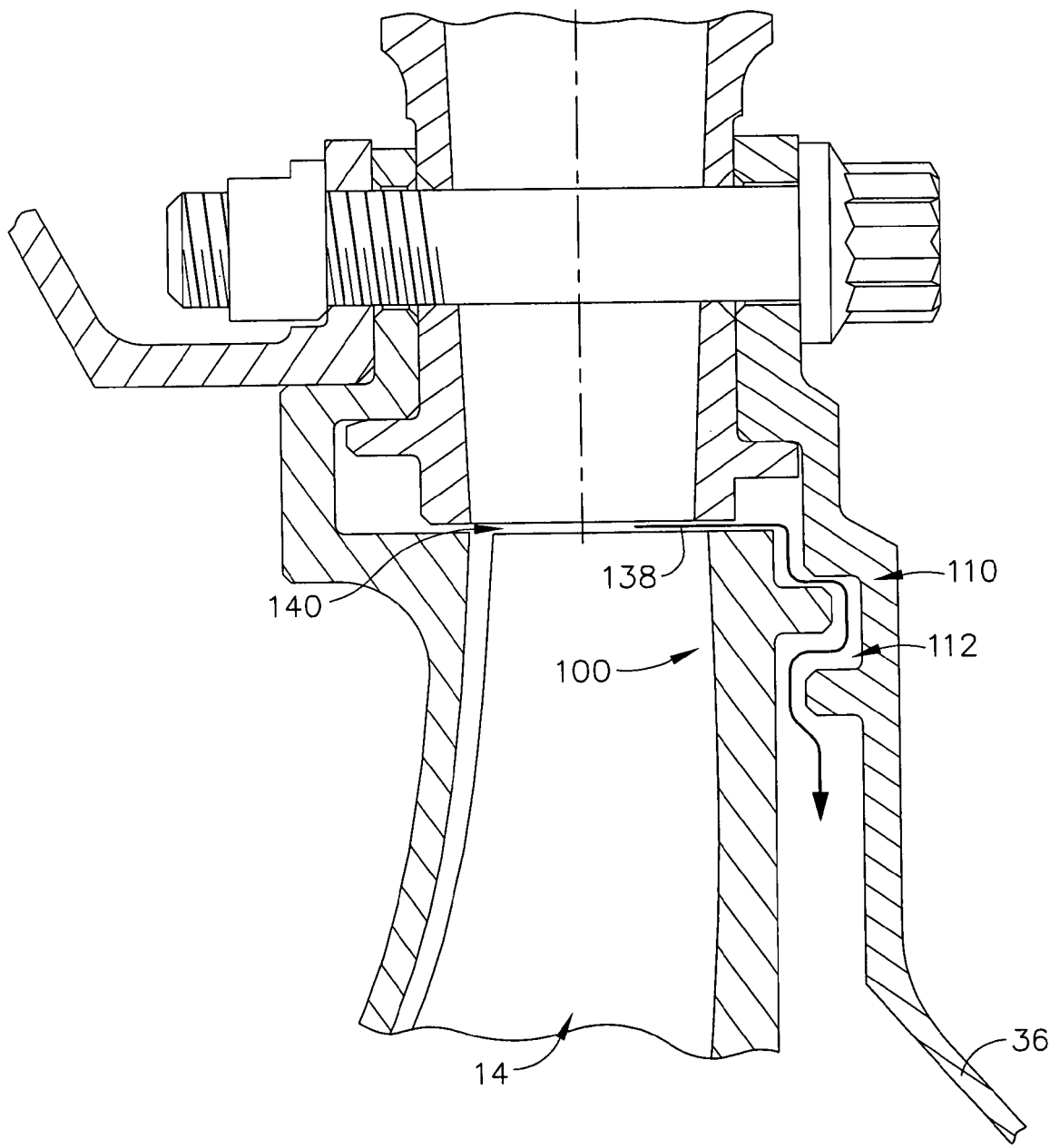
FIG. 4 is a view of the gas turbine engine assembly shown in FIG. 1 during normal operation.

As shown in FIG. 4, during operation, compressed air 138 is discharged from compressor 14 and channeled through an opening 140 that is defined between compressor 14 and an inlet to combustor 16 into labyrinth seal assembly 100. More specifically, the compressed air 138 is channeled through first orifice 110 and then through second orifice 112, into seal cavity 142, and then discharged axially aft through seal assembly 40.

Channeling compressed air through labyrinth seal assembly 100 facilitates creating a pressure drop at the maximum radius of the compressor 14, thus significantly reducing the cavity pressure, and therefore reducing the axial load on compressor 14. More specifically, and referring to FIG. 5, line 200 represents a threshold calculation of the free vortex pressure inside the seal cavity 142 without seal assembly 100, line 210 represents the known gas turbine engine that does not include seal assembly 100, and line 220 represents gas turbine engine assembly 10 including seal assembly 100.

Figure 5:
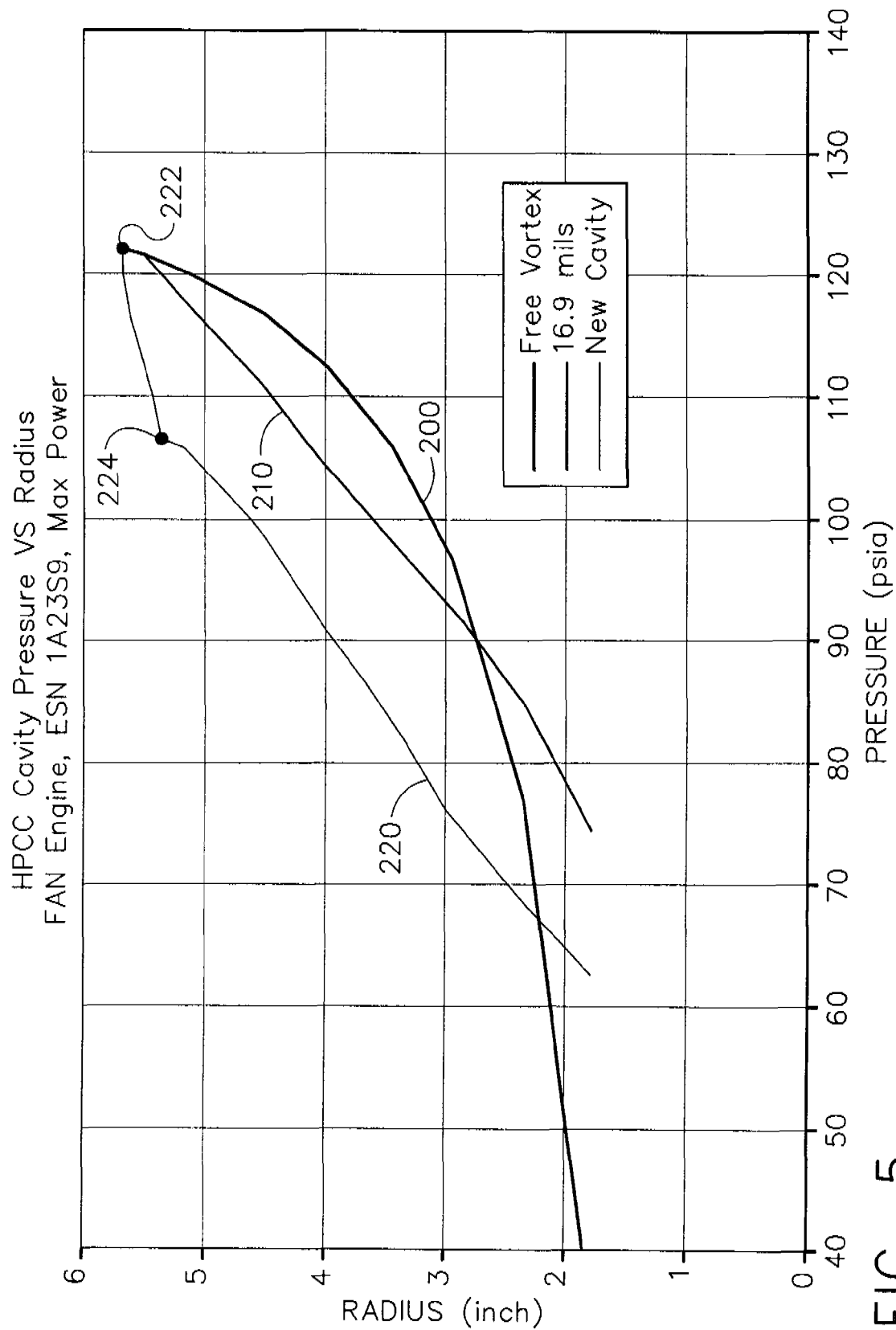
FIG. 5 is a graphical illustration of the gas turbine engine shown in FIG. 1 during normal operation.

As shown in FIG. 5, as compressed air is channeled through seal assembly 100 at a point 222, seal assembly 100 creates a pressure drop that extends from point 222 to point 224. Moreover, the pressure drop is created proximate to a radially outer periphery of compressor 14. As shown, the pressure within the seal cavity 142 gradually decreases using of a quasi free-forced vortex until the compressed air is discharged through seal 40 and orifice 41 into a cavity 43. Accordingly, as shown in FIG. 5, seal assembly 100 facilitates reducing the pressure within the seal cavity 142 compared to known engines that do not include seal assembly 100. As a result, of reducing the pressure within seal cavity 142, seal assembly 100 facilitates reducing the axial forward load on compressor 14.

The above-described seal assembly is cost-effective and highly reliable. The seal assembly includes a labyrinth seal that includes a first orifice stage and a second orifice stage that is positioned downstream of the first orifice stage. Moreover, the first and second orifice stages are selectively sized to facilitate regulating the quantity of airflow channeled through the two-stage labyrinth seal assembly and to thus facilitate balancing the load forces seen by the high-pressure compressor. As a result, the labyrinth seal assembly described herein facilitates creating a pressure drop proximate to a radially outer edge of the high-pressure compressor wherein the axial forces on the compressor are effectively reduced.

While the invention has been described in terms of various specific embodiments, those skilled in the art will recognize that the invention can be practiced with modification within the spirit and scope of the claims.

What is claimed is:

1. A method of assembling a gas turbine engine comprising:
   coupling a combustor downstream from a compressor;
   coupling a turbine to the compressor, wherein a recess is formed in a turbine mid-seal support structure of said turbine; and
   orienting the turbine relative to the compressor such that a cavity is defined between the compressor and the turbine and such that a seal assembly extending from an aft side of the compressor is positioned such that when air is discharged through the seal assembly, the seal assembly facilitates reducing the operating pressure within the cavity, and facilitates reducing axial forces induced to the aft side of the compressor.

2. The method in accordance with claim 1 wherein the compressor comprises a high-pressure centrifugal compressor.

3. The method in accordance with claim 1 wherein orienting the turbine relative to the compressor further comprises inserting a tab extending from the high-pressure compressor at least partially into the recess to form a two-stage labyrinth seal assembly.

4. The method in accordance with claim 3 further comprising positioning the tab such that the tab and recess define a first orifice stage and a second orifice that is downstream from the first orifice stage.

5. The method in accordance with claim 4 wherein the first orifice has a first diameter and the second orifice has a second diameter that is different than the first diameter.

6. The method in accordance with claim 5 wherein the first and second diameters are sized to regulate the quantity of airflow channeled through the seal assembly.

7. The method in accordance with claim 1 wherein orienting the turbine relative to the compressor further comprises positioning a labyrinth seal assembly extending from the axially aft side of the compressor such that air discharged through the seal assembly is utilized to create a pressure drop aft of the compressor and to facilitate reducing the forward axial load of the compressor.

8. A seal assembly for a gas turbine engine including a combustor downstream from a centrifugal compressor, a turbine coupled to the compressor, and a turbine mid-seal support structure, said seal assembly comprising:
   a recess formed in the turbine mid-seal support structure; and
   a labyrinth seal assembly extending aft of the centrifugal compressor such that air discharged through said seal assembly facilitates reducing the operating pressure within a cavity formed between said compressor and said turbine, and reduces axial forces induced to an aft side of the centrifugal compressor.

9. The seal assembly in accordance with claim 8 wherein said seal assembly is coupled proximate to a radially outer edge of the centrifugal compressor.

10. The seal assembly in accordance with claim 8 further comprising a tab extending from the compressor at least partially into said recess to form a two-stage labyrinth seal assembly.

11. The seal assembly in accordance with claim 10 wherein said two-stage labyrinth seal assembly comprises a first orifice stage and a second orifice that is downstream from the first orifice stage.

12. The seal assembly in accordance with claim 11 wherein said first orifice has a first diameter and said second orifice has a second diameter that is different than said first diameter.

13. The seal assembly in accordance with claim 12 wherein said first and second diameters are sized to regulate the quantity of airflow channeled through said seal assembly.

14. The seal assembly in accordance with claim 8 wherein said labyrinth seal assembly is positioned on the axially aft side of the compressor such that air discharged through the seal assembly creates a pressure drop aft of the compressor and facilitates reducing the forward axial load of the compressor.

15. A gas turbine engine assembly comprising:
   a centrifugal compressor;
   a combustor downstream from said centrifugal compressor;
   a turbine coupled to said compressor, such that a cavity is defined between the compressor and the turbine;
   a turbine mid-seal support structure, such that a recess is formed therein; and
   a seal assembly extending aft of said centrifugal compressor such that air discharged through said seal assembly facilitates reducing the operating pressure within said cavity, and reduces axial forces induced to an aft side of said centrifugal compressor.

16. The gas turbine engine assembly in accordance with claim 15 wherein said seal assembly is positioned proximate to a radially outer edge of the centrifugal compressor.

17. The gas turbine engine assembly in accordance with claim 15 wherein said seal assembly further comprises a tab extending from said compressor at least partially into said recess to form a two-stage labyrinth seal assembly.

18. The gas turbine engine assembly in accordance with claim 16 wherein said seal assembly comprises a first orifice stage and a second orifice that is downstream from the first orifice stage.

19. The gas turbine engine assembly in accordance with claim 18 wherein said first orifice has a first diameter and said second orifice has a second diameter that is different than said first diameter.

20. The gas turbine engine assembly in accordance with claim 19 wherein said first and second diameters are sized to regulate the quantity of airflow channeled through said seal assembly.

* * * * *